J. H. WAGENHORST.
VEHICLE WHEEL RIM.
APPLICATION FILED NOV. 24, 1915.

1,231,538.

Patented June 26, 1917.

James H. Wagenhorst, Inventor
By his Attorney
Seward Davis

UNITED STATES PATENT OFFICE.

JAMES H. WAGENHORST, OF AKRON, OHIO.

VEHICLE-WHEEL RIM.

1,231,538.  Specification of Letters Patent.  Patented June 26, 1917.

Continuation in part of applications Serial No. 702,851 and Serial No. 702,854, filed June 10, 1912. This application filed November 24, 1915. Serial No. 63,152.

*To all whom it may concern:*

Be it known that I, JAMES H. WAGENHORST, a citizen of the United States, residing in the city of Akron, county of Summit, and State of Ohio, have invented certain new and useful Improvements in Vehicle-Wheel Rims, of which the following is a specification.

This invention relates to improvements in vehicle wheel rims of the class designed to carry a pneumatic or other resilient tire. The invention consists in an improved form of transversely split tire-carrying rim having rigidly mounted members whose interlocking engagement prevents the accidental separation of the rim ends both circumferentially and radially, but permits their mutual engagement or disengagement by the relative lateral movement of the rim ends as desired.

The present application is a division of my co-pending application Serial Number 16,830, filed March 25, 1915, which is a continuation of my applications Serial Numbers 702,851 and 702,854, both filed June 10, 1912, and patented, respectively, as Nos. 1,136,984 and 1,160,224.

Figure 1:
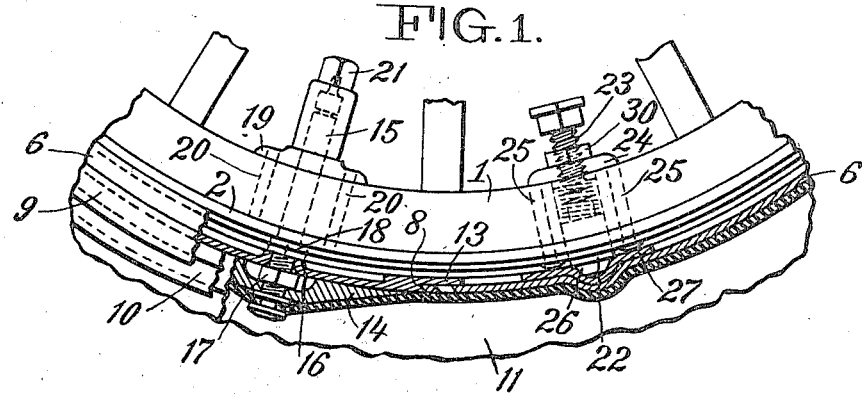
Figure 2:
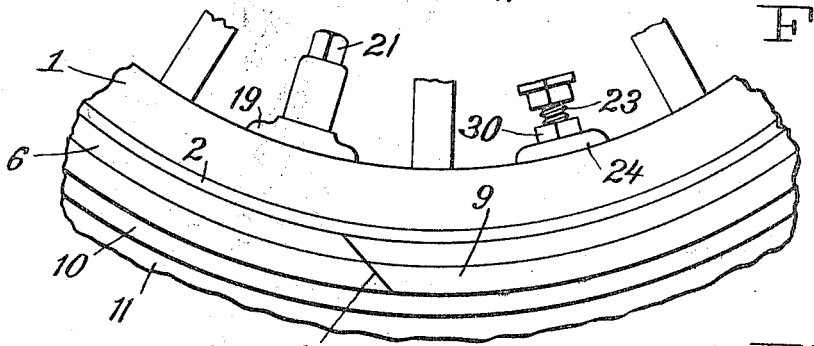
Figure 3:
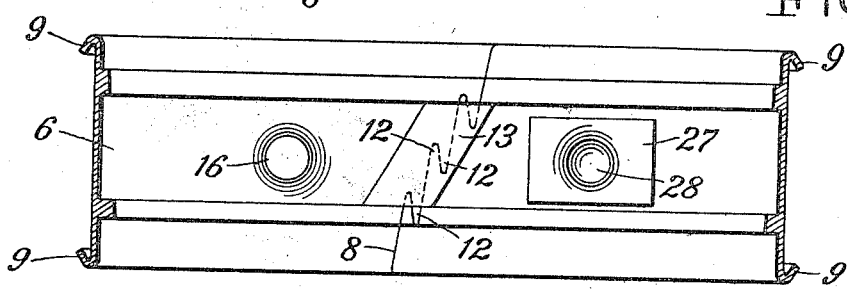
Figure 4:
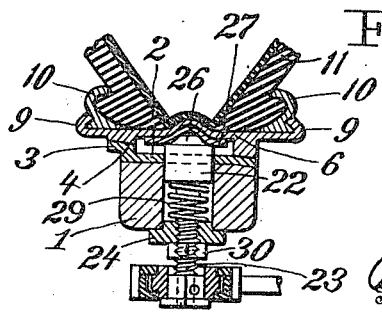

In the accompanying drawings which form a part of this specification, Figure 1 is a side elevation of a part of a wheel felly having one of my improved rims applied thereto, a portion of the tire-carrying rim and associated parts being shown in circumferential section; Fig. 2 is a side elevation corresponding to Fig. 1, showing the latter without sectional portions; Fig. 3 is a bottom plan view of a portion of the rim base of the tire-carrying rim removed from the wheel and showing the transverse joint therein; Fig. 4 is a transverse section through the wheel felly and rim showing one of the radial securing bolts and illustrating in cross-section the socket of a form of wrench used in connection therewith.

Referring to the drawings in detail, the numeral 1 designates the wood felly of a wheel provided with an endless metallic felly band 2. The latter is provided with bearing surfaces for engagement with complementary bearing surfaces upon the tire-carrying rim, one of these bearing surfaces 3 being preferably formed upon a flange 4 so as to have a greater diameter than the bearing surface 5 formed at the opposite edge of the felly band, and the surfaces 3 and 5 being preferably inclined slightly in the same general direction. Any other suitable method of mounting the rim may, however, be employed.

6 is the tire-carrying rim. As herein specifically illustrated, it comprises a rim base 7 transversely split at 8 and having inwardly hooked flanges 9 at its edges. The flanges 9 engage the endless tire-retaining flanges 10 which retain the beads of the tire 11. As shown, the flanges 10 are reversible, so that the rim may be used to carry either a tire of clencher form or a straight-sided tire.

The rim ends are formed with complemental interengaging teeth or tongues 12 which prevent circumferential expansion of the rim, and when there are a plurality of these teeth on each rim-end, as illustrated, the general direction of the split 8 is diagonal to the plane of the wheel. One end of the rim base carries a plate 13 which extends slightly under the opposite end of the rim base, this plate preventing the inward movement of the end of the rim base overlapping the same, and the edge of the plate 13 is inclined at an angle, as shown in Fig. 3. The split 8 is also preferably formed upon an angle to the axial plane of the wheel, as shown in Figs. 1 and 2, the beveled end of the rim base carrying the plate 13 being arranged to overhang the other end of the rim base, so that the end carrying the plate 13 can not be moved radially inward with relation to the opposite end. It will thus be seen that the ends of the rim base are adapted to mutually interengage and disengage by a relative lateral movement, and the face of each comprises intersecting planes angularly disposed with respect to adjacent axial planes. The rim ends thus present a plurality of complemental interengageable teeth, the teeth of either end, when engaged, overlapping the teeth of the other end, since the general direction of the plane of the cut by which they are formed is both oblique to the radial plane of the wheel and to an axial plane. Thus the two plane faces of each tooth or tongue are angularly disposed both relatively to each other and to the radial plane of the wheel, and also each such plane face is angularly disposed with respect to an adjacent axial plane. Thus the ends are normally locked against relative radial displacement in either direction as well as against circumferential separation. The ends of the rim may be disengaged by displacing them laterally until the edge of the plate 13 clears the ends of the tongues 12 on the opposite end of the rim, when such opposite end may be depressed and passed under the end of the rim carrying the plate. The rim may then be contracted sufficiently to permit the flanges 10 and the tire to be readily removed.

The details of structure here described may be modified without departing from my invention.

The valve stem 15 is preferably located near the point where the rim is split, as shown in Figs. 1, 2 and 3, and carries the usual plate or tire-bead spreader 14. In forming an opening through the rim base for the valve stem I may draw up the metal around the opening into a sort of bell mouth or flange 16, shown in Fig. 1, which receives the edge of a nut 17 on the valve stem to hold the spreader 14 in position. The edge of the flange 16 forms a seat for a nut 18 screwed on the valve stem to draw the spreader down upon the rim base and thus wedge the beads of the tire against the flanges 10 and hold them separated, thus preventing the lateral displacement of the ends of the rim base. As shown, the valve stem 15 is inclosed in a valve cap 21, and the latter may screw upon the valve stem in the usual manner, although I have here represented it as attached to the wheel independently, so that the rim and tire may be removed from the wheel without removing the valve cap, if desired. 19 is an attaching plate secured to the inner surface of the wheel felly by means of screws 20, and this plate is provided with an opening into which the end of the valve cap is screwed.

The removable tire-carrying rim is locked upon the wheel in any suitable way, as by means of a plurality of radial studs 22 which slide in holes in the felly and are provided with screw-threaded stems 23 which screw through plates 24 secured to the under-surface of the felly. These plates, as shown in Fig. 1, have integral prongs or rods 25 turned up at each end, such rods passing through holes in the felly and the felly band and being riveted to the latter. Each stud has a convex tapering bearing surface 26 which is adapted to fit a rounded depression in the rim base. The sockets formed in the rim for the reception of these radial studs are reinforced by welding or brazing wear plates 27 to the under-surface of the rim, these being depressed as indicated at 28 to conform to the depressed sockets in the rim. The extreme ends of the radial studs are flattened, while the depressions formed in the rim and wear plates are rounded, so that a slight clearance is left between the flattened ends of the bolts and the bottoms of the sockets in the wear plates.

When the radial studs are forced out, the tapered ends thereof are caused to engage the sockets in the under-surface of the rim. Further rotation of the studs forces the bearing surfaces of the rim away from the bearing surfaces of the felly band adjacent to the studs, thus distorting the rim slightly out of true circular configuration and drawing the portions of the rim between adjacent studs into close contact with the bearing surface of the felly band. The rim is then caused to grip the wheel throughout the greater part of its periphery and a very solid bearing of the rim upon the wheel is obtained. The distortion of the rim is not sufficient to affect the running qualities of the wheel.

For preventing accidental rotation of the studs, I may use any suitable means, for example, spiral spring lock washers 29.

Either in addition to the lock washers, or in place of the same, I may use nuts 30 screwing on the stems of the studs. These nuts are preferably used whether the lock washers are used or not, as in addition to their function as lock nuts, they serve to limit the outward radial movement of the studs. The lock nuts fit the screw-threaded stems of the studs somewhat tightly so that they will normally remain stationary upon such stems. They thus serve to limit the outward movement of the studs when the latter are operated by means of the wrench, and thus prevent one stud from being forced out farther than the others, which would result in mounting the rim eccentrically upon the wheel.

It will thus be seen that the described structure presents features of utility and advantage not heretofore attained in a transversely split demountable rim, in that the abutting ends of the split ring so interlock as to prevent their relative movement circumferentially, and so interengage as to prevent their relative movement radially, while at the same time, permitting their mutual release solely by their relative lateral movement, and their engagement similarly by the relative lateral movement thereof, and that these features result from the self-contained complemental means afforded by the rim ends themselves without the use of supplemental locking or engaging means such as keys, bolts, bridging pieces, pivoted latches, or the like additional auxiliary parts.

I claim:

1. A tire-carrying rim for resilient tires comprising a transversely split ring carrying tire-engaging means, the ends of said ring having rigid interlocking means integral therewith for preventing relative movement of said ends in radial and circumferential directions, the ends of said ring being disengageable by relative lateral movement thereof.

2. A transversely split demountable rim for vehicle wheels, the abutting rim ends constituting interlocking members engageable and disengageable by relative lateral movement thereof and adapted to lock said ends against both circumferential and radial separation.

3. A transversely split demountable rim for vehicle wheels, the abutting rim ends being adapted to interengage and disengage by relative lateral movement thereof, the said rim ends constituting the sole means for interlocking said ends against circumferential separation and against relative radial movement in either direction.

4. A demountable rim transversely split at an angle to the plane thereof, whose ends are adapted to interengage, the face of each end comprising intersecting planes angularly disposed with respect to adjacent axial planes, their interengagement locking said rim ends against circumferential displacement in either direction, and means borne by an end adapted to engage beneath the other and to lock them against radial displacement in either direction.

5. A demountable rim transversely split at one point only and in the general direction of a chord, so that one of its abutting ends overlies the face of the other, the outer end being adapted to receive the inner end laterally between a rigid extension formed below the base of the outer end and its circumferentially extending face the abutting ends of said rim being adapted to interlock positively.

6. A demountable rim transversely split at an angle to the plane thereof, the rim ends being formed to constitute fixed complemental means adapted both to interlock to prevent circumferential movement and to interengage to prevent radial movement of said rim, their interlocking and interengagement resulting from their relative lateral movement.

7. A transversely split demountable rim for vehicle wheels having rigidly mounted members engageable and disengageable by relative lateral movement of the rim ends for interlocking said ends against circumferential and radial separation.

8. A transversely split demountable rim for vehicle wheels having rigidly mounted members engageable and disengageable by relative lateral movement of the rim ends for interlocking said ends against circumferential separation and against relative radial movement in either direction.

JAMES H. WAGENHORST.